United States Patent [19]
Cunningham et al.

[11] Patent Number: 5,409,259
[45] Date of Patent: Apr. 25, 1995

[54] GAS GENERATOR FOR VEHICLE OCCUPANT RESTRAINT SYSTEM

[75] Inventors: Donald J. Cunningham, North Ogden; James D. Erickson, Ogden, both of Utah

[73] Assignee: Morton International, Inc., Chicago, Ill.

[21] Appl. No.: 958,934

[22] Filed: Oct. 9, 1992

[51] Int. Cl.⁶ .............................................. B60R 21/26
[52] U.S. Cl. ............................ 280/741; 422/166; 102/202.5
[58] Field of Search ................ 280/736, 741; 102/530, 102/531, 202.5; 60/256; 422/164, 165, 166

[56] References Cited

U.S. PATENT DOCUMENTS

| | | | |
|---|---|---|---|
| 2,440,241 | 4/1948 | Hickman | 60/256 |
| 2,995,088 | 8/1961 | Asplund | 102/530 |
| 3,258,910 | 7/1966 | Seymour | 60/256 |
| 3,435,765 | 4/1969 | Gawlick | 102/531 |
| 3,723,205 | 3/1973 | Scheffee | 280/741 |
| 3,773,351 | 11/1973 | Catanzarite | 280/150 AB |
| 3,985,076 | 10/1976 | Schneiter et al. | 280/741 |
| 4,013,010 | 3/1977 | Schneiter et al. | 280/740 |
| 4,131,299 | 12/1978 | Ono et al. | 280/741 |
| 4,158,696 | 6/1979 | Wilhelm | 422/166 |
| 4,249,673 | 2/1981 | Katoh et al. | 280/741 |
| 4,296,084 | 10/1981 | Adams | 422/166 |
| 4,370,930 | 2/1983 | Strasser et al. | 102/530 |
| 4,394,033 | 7/1983 | Goetz | 280/736 |
| 4,833,996 | 5/1989 | Hayashi | 102/530 |
| 4,846,368 | 7/1989 | Goetz | 280/736 |
| 4,858,951 | 8/1989 | Lenzen | 280/741 |
| 4,919,897 | 4/1990 | Bender et al. | 422/165 |
| 4,950,458 | 8/1990 | Cunningham | 422/164 |
| 4,988,751 | 3/1991 | Paxton et al. | 280/741 |
| 5,048,862 | 9/1991 | Bender et al. | 280/736 |
| 5,062,367 | 11/1991 | Hayashi | 280/741 |
| 5,100,170 | 3/1992 | Mihm et al. | 280/735 |
| 5,259,644 | 11/1993 | Albrecht et al. | 280/741 |

FOREIGN PATENT DOCUMENTS

| | | |
|---|---|---|
| 0589152 | 3/1994 | European Pat. Off. . |
| 3731829 | 6/1989 | Germany ............ 280/736 |
| 4229624 | 3/1993 | Germany ........ B60R 21/26 |

OTHER PUBLICATIONS

Search Report of Feb. 3, 1994 in EP Application No. 93308051.7.

*Primary Examiner*—Karin L. Tyson
*Attorney, Agent, or Firm*—George W. Pauchfuss, Jr.; Gerald K. White

[57] ABSTRACT

A gas generator for vehicle occupant restraint systems comprises an elongated housing having gas outlet openings, a sealed, rupturable gas generant cartridge positioned within the housing, and pyrotechnic gas generant contained in the cartridge. An igniter capsule mounted at one end of the housing has an exit opening juxtaposed the sealed gas generant cartridge. The igniter capsule contains ignitor material, and an initiator and initiator charge. The initiator ignites the ignitor material which expels a fireball of hot combustion products from the opening, capsules exit rupturing the sealed cartridge and igniting the gas generant charge to produce gas for inflating an air bag. A rupturable seal is provided over the exit opening of the ignitor capsule and a nozzle directs hot combustion products to the gas generant cartridge. The initiator charge is auto ignitor material for operating the gas generator if it is exposed to fire. The ignitor capsule comprises overlapping metal parts, and is mounted as a closure of the elongated housing. The gas generant cartridge is placed in the housing surrounded by filtering and cooling screens. One end of the rupturable gas generant cartridge adjacent the ignitor capsule outlet is scored for rupturing inwardly to admit the ignitor fireball. The cartridge contains wraps of filter screen to provide structural rigidity, and additional filter and cooling materials surround the cartridge.

32 Claims, 2 Drawing Sheets

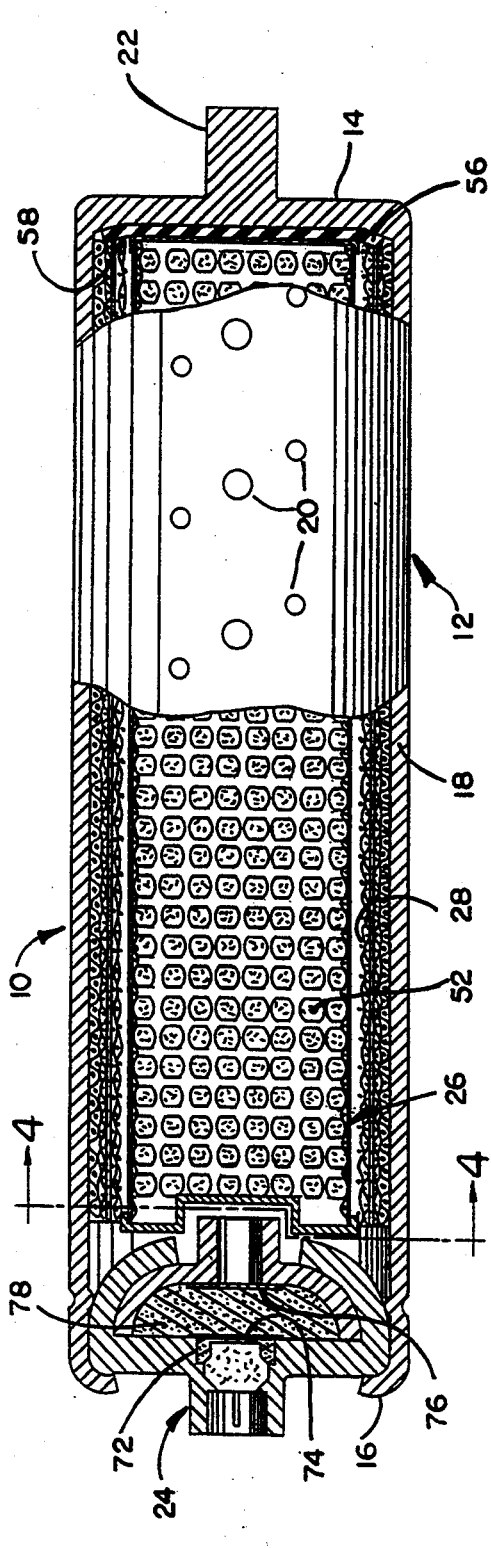
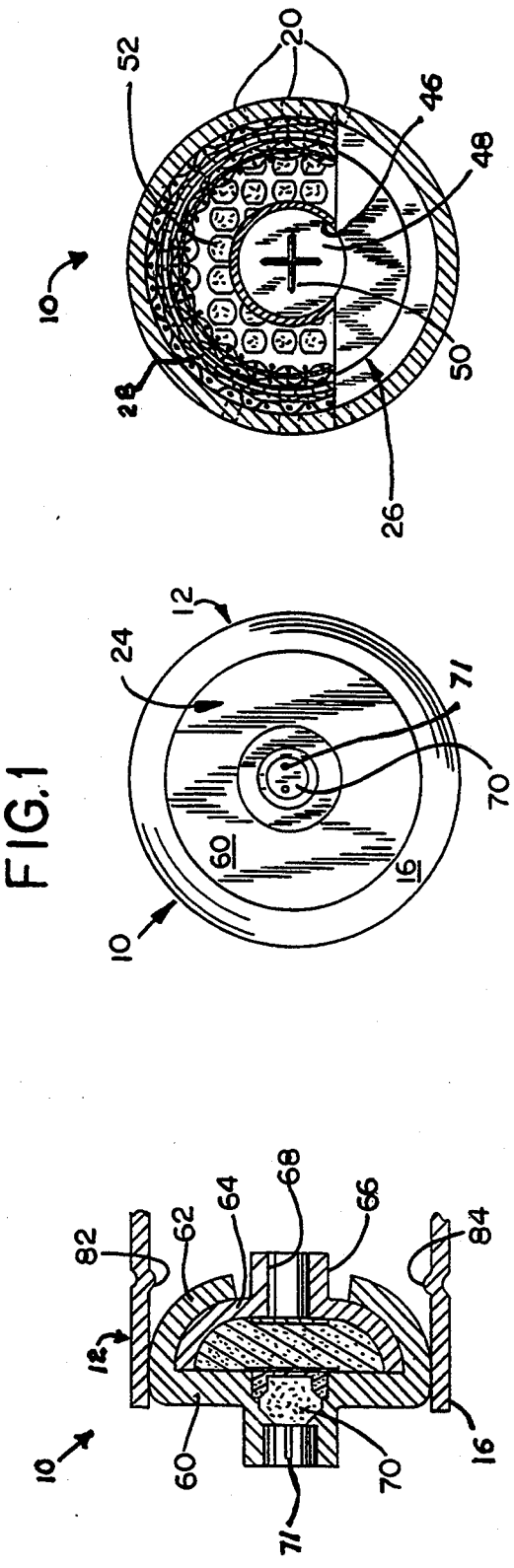

GAS GENERATOR FOR VEHICLE OCCUPANT RESTRAINT SYSTEM

BACKGROUND OF THE INVENTION

1. Field of the Invention

This invention relates to gas generators, or inflators, using pyrotechnic gas generant for inflating air bags which are part of a vehicle occupant restraint system.

2. Description of Prior Art

Gas bags, which are more commonly referred to as air bags, are mounted within vehicles in positions to deploy in the event of a crash and to cushion an occupant from the effects of the crash. It is well known in the art to inflate air bags by gas generators using a combustible solid gas generant charge.

A typical gas generator for a passenger side air bag includes a cylindrical housing having openings therein for release of gas, a gas generant charge deployed along the interior length of the housing in pellet or wafer form, and a cooling and filtering structure surrounding the combustible gas generant charge in order to filter out hot or burning particles and cool the gas produced by the gas generant charge. Ignition of the gas generant charge is achieved by an igniter tube extending through the gas generant charge along the axis of the charge and the housing. The tube typically contains rapid detonation cord, or fuse, and igniter powder. An electric initiator and charge, or squib, is mounted at one end of the housing and lights the fuse. The fuse in turn sets off the igniter powder, which bursts the igniter tube and lights the gas generant charge.

Although it is a requirement that a gas generator produce gas very quickly so that the air bag deploys in time to provide occupant protection, there are also disadvantages in deploying the air bag too quickly. In particular, an overly rapid deployment of the air bag can injure an out-of-position occupant, especially a child. Thus, it is preferable that the initial deployment of the air bag be somewhat retarded, in order to avoid such an injury.

Most proposals for controlling the rate of initial gas generation have involved dividing the inflators into two stages. This is sometimes accomplished by dividing the single inflator housing into two chambers or compartments, each of which contain combustible gas generant material and providing a delay between ignition in the two chambers.

All of the foregoing has led to more complexity and cost in the manufacture of gas generators for air bags. As such gas generators are more widely used in vehicles, there is a need for more economical construction and ease of assembly, with due regard for controlled delivery of inflation gases to protect an out-of-position occupant.

SUMMARY OF THE INVENTION

An object of the invention herein is to provide an improved gas generator for vehicle occupant restraint systems which features simplicity and efficiency in the construction thereof that enables economic manufacture and assembly.

Another object of the invention is to provide an improved gas generator having an igniter capsule for mounting in the housing.

A further object of the invention is to provide an improved gas generator with a combustible gas generant provided in a sealed cartridge subassembly which facilitates shipping and handling of the gas generant prior to assembly of the generator and simplifies the assembly process itself.

An additional object of the invention is to provide an improved gas generator where the igniter and combustible gas generant are provided in separate, sealed subassemblies which are adjacently positioned in a housing and reliably cooperate to produce gas for inflating the air bag of a vehicle occupant restraint system.

Yet another object of the invention is to provide an improved gas generator for vehicle occupant restraint systems which has a single stage of combustible gas generant and provides controlled delivery of gas for inflating an air bag with due regard for the possibility of an out-of-position passenger.

In accomplishing these and other objects of the invention, there is provided a gas generator for vehicle occupant restraint systems which comprises an elongated housing having gas outlet openings formed along at least a portion of the length thereof, a pyrotechnic gas generant material contained within the housing, and an igniter capsule mounted to the housing. The igniter capsule has an outlet opening to the interior of the housing and juxtaposed the gas generant material therein, igniter material confined in the capsule, and an initiator for ignition of the igniter material. Operation of the initiator ignites the igniter material which burns rapidly and expels a fireball of hot products of combustion from the igniter capsule opening into contact with the pyrotechnic gas generant material, which is thereby ignited to produce gas for inflating the air bag of a vehicle occupant restraint system.

According to certain aspects of the invention, a rupturable seal is provided over the outlet of the igniter capsule, and a nozzle extends from the outlet for directing the hot products of combustion toward the gas generant charge. Further features of the invention include providing an auto igniter for setting off the igniter material to operate the gas generator if it is exposed to fire, and positioning the auto igniter between the initiator and the igniter material whereby the auto igniter is also used as the initiator charge in the normal operation of the gas generator.

According to further aspects of the invention, the igniter capsule is formed of two overlapped metal parts, the igniter capsule is positioned at the open end of the elongated housing, and the end of the housing wall is rolled over the igniter capsule to mount and retain it.

According to additional aspects of the invention, the pyrotechnic gas generant charge is sealed in a rupturable cartridge. The gas generant cartridge is placed in the housing surrounded by filtering and cooling screens. One end of the gas generant cartridge is positioned adjacent the outlet of the igniter capsule and the gas generant cartridge has a scored or otherwise weakened entry wall which ruptures inwardly to admit the igniter fireball.

According to other features of the invention, the gas generant cartridge is generally cylindrical and is formed of a sheet of aluminum having a lapped, adhesively-sealed seam. End caps close the cartridge, and the end cap adjacent the igniter capsule has a scored or otherwise weakened portion for admitting the igniter fireball.

The gas generant charge is provided with a selected surface area to volume ratio to burn somewhat progressively and, in cooperation with the remaining structure of the gas generator, provide a delivery of gas for inflating the air bag of a vehicle occupant restraint system consistent with protecting an out-of-position passenger.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this summary of the invention, a detailed description follows with reference being made to the accompanying drawings which form a part of the specification, of which:

FIG. 1 is a side elevation view, partially in longitudinal section, of a gas generator for a vehicle occupant restraint system, according to the invention herein;

FIG. 2 is a longitudinal sectional view of the open end of the gas generator of FIG. 1, showing the housing and the igniter capsule thereof, during mounting of the igniter capsule;

FIG. 3 is an end view of the gas generator of FIG. 1;

FIG. 4 is a cross sectional view of the gas generator of FIG. 1, taken along the lines 4—4 of FIG. 1.

The same reference numerals refer to the same elements throughout the various figures.

DESCRIPTION OF THE PREFERRED EMBODIMENT

Figure 5:
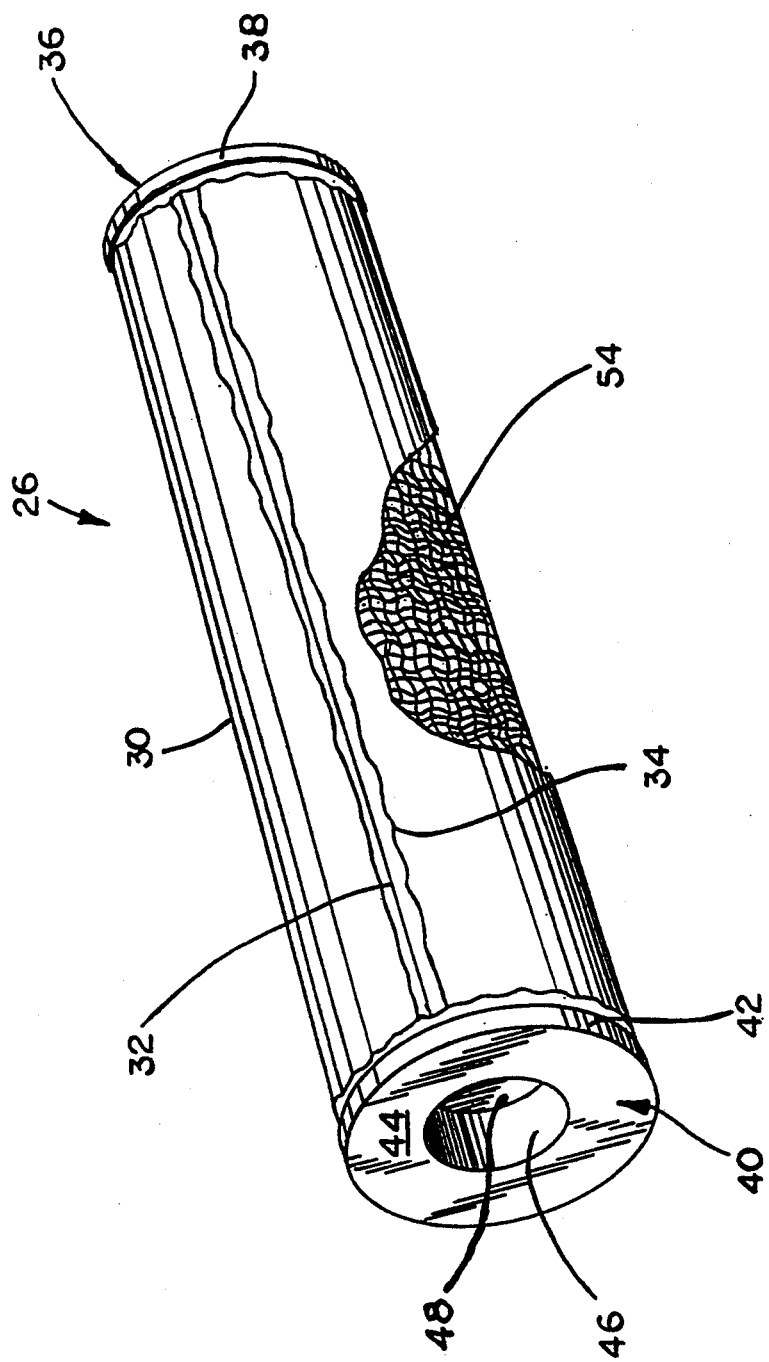
FIG. 5 is a perspective view, partially cut away, of the gas generant cartridge of the gas generator of FIG. 1.

With reference to the figures and especially FIG. 1, there is shown a gas generator 10 for inflating the air bag of a vehicle occupant restraint system. Although the gas generator 10 described herein is well adapted for inflating the air bag on the passenger side of the vehicle, the invention herein is applicable to inflating air bags in other locations as well.

The gas generator 10 includes a generally cylindrical housing 12 having a closed end 14 and an open end 16 with a tubular side wall portion 18 therebetween. The housing 12 is preferably fabricated of aluminum, with the closed end 14 integral with the elongated tubular side wall portion 18. The tubular side wall 18 defines a plurality of openings, generally indicated at 20, to permit the outflow of gas. The openings 20 are provided in a repetitious pattern along the side wall in diametrically opposed groups, in order that the outflow of gas does not produce uneven thrust which could cause the gas generator 10 to become a projectile. This "thrust neutral" deployment of openings is known in the art. The housing 12 further comprises a mounting stud 22 extending axially from the closed end wall 14, the stud being utilized to mount the gas generator 10 in its operable position in a vehicle restraint system.

An igniter capsule 24 is mounted in the open end 16 of the housing 12, as more fully described below, and the housing contains a gas generant cartridge 26 and a filter and cooling assembly 28, also described in more detail below.

With reference to FIG. 5, the gas generant cartridge 26 is shown in perspective view, partially cut away. The gas generant cartridge comprises a tubular side wall 30, which is preferably fabricated of a sheet of aluminum rolled into a tube with overlapping edges forming a seam at 32. The seam 32 is secured and sealed with hot melt adhesive, a portion of which is indicated at 34. The cartridge 26 has a first end cap 36 which comprises a circular end wall, not visible in FIG. 5, and a skirt 38 which overlaps the tubular side wall 30. The end cap 36 is also secured and sealed with hot melt adhesive. The side wall 30 and end cap 36 are fabricated of relatively thin aluminum sheet, on the order of 0.004–0.006 inches. A second end cap 40 of the cartridge 26 is fabricated of thicker aluminum on the order of 0.030 inches, and also has a skirt 42 which is secured over and sealed the tubular side wall 30 with hot melt adhesive. The second end cap 40 is characterized by an end wall 44 having a central cylindrical recess 46 supporting an offset rupturable entry wall 48. As best seen in FIG. 4, the offset rupturable entry wall 48 has a scored cruciform 50 formed thereon, to a depth leaving a thickness on the order of 0.003 inches. Alternate shapes of scoring or weakening can be utilized, such as stamping the rupturable entry wall 48 to a thin, easily ruptured condition.

The cartridge 26 when assembled with pyrotechnic gas generant the rein is totally sealed by the components thereof and the hot melt adhesive. The cartridge is filled with and contains pyrotechnic gas generant material comprising a plurality of pellets 52. The gas generant material may be one of any number of compositions meeting the requirements of burning rate, non-toxicity and flame temperature. One composition which is utilized in the preferred embodiment is that described in U.S. Pat. No. 4,203,787 to Schneiter et al., the disclosure of which patent is incorporated herein by reference. Particularly preferred are compositions comprising from about 65 percent by weight to about 70 percent by weight metal azide, up to about 4 percent by weight sulfur and from about 27 percent to about 33 percent by weight molybdenum disulfide, especially a composition comprising about 68 percent by weight sodium azide, about 2 percent by weight sulfur and about 30 percent by weight molybdenum disulfide.

In the preferred embodiment, the pellets are generally disc shaped, having a diameter of approximately 0.375 inches and a thickness of 0.142 inches. Although generally disc like, the pellets typically have a slightly curved, convex configuration. It will be appreciated that the gas generant material may also be provided in the form of circular wafers.

The gas generant cartridge 26 further comprises a filter 54 in the form of two wraps of 30 mesh stainless steel screen which are deployed immediately adjacent and inside the tubular side wall 30. The screen provides a filter with respect to the gas generant and further provides structural rigidity and strength to the cartridge 26. Thus, the cartridge 26 may be fabricated with the screen 54 and pellets 52 therein, and sealed as a subassembly. The cartridge 26 may be handled, shipped, and stored prior to assembly into the gas generator 10, and the assembly itself is simplified by providing the gas generant in a shaped, easily handled unit.

The gas generant cartridge 26 is positioned in the housing 12, and is surrounded therein by the filter and cooling assembly 28. The filter and cooling assembly 28 is generally annular in cross section and, by way of example but not limitation, may include, beginning with the innermost layer next to the cartridge 26, two wraps of nickel-coated carbon or stainless steel 30 mesh screen, then plural wraps of a metal filter such as 80×700 or 50×250 mesh stainless steel or 40×180 mesh nickel-coated carbon, then a single wrap of ceramic filter paper 0.080 inches thick and two additional wraps of 30 mesh stainless or nickel-coated carbon. The filter and cooling assembly 28 extends along the entire length of the cartridge 26 and surrounds its tubular side wall 30. A rubber pad 56, capable of withstanding high temperature, is positioned on the inside of the closed end 14 of the housing 12, and the end of the filter and cooling assembly 28 butts against the rubber pad 56, as indicated at 58. The rubber pad 56 provides a sealing function with respect to the end of the filter and cooling assembly 28.

The igniter capsule 24 is positioned at the other end of the housing 12 and functions both to provide closure for the housing as well as ignite the combustible gas generant contained in the cartridge 26. The igniter capsule 24 comprises a base 60 having a integral skirt 62 extending from the periphery. Prior to assembling the igniter capsule 24, the skirt 62 is tubular. A cap 64 of generally hemispherical configuration is received against the periphery base 60 adjacent and inside the skirt 62, and the skirt 62 is roll crimped onto the cap in order to assemble the base 60 and cap 64 together, as they are shown in the drawings. The cap 64 further defines a nozzle 66 extending from outlet opening 68 from the interior of the igniter capsule 24.

The base 60 of the igniter capsule defines an opening receiving and mounting an initiator 70. Initiators are well-known in the art, also by the term "squib" and provide ignition upon receipt of an electric pulse upon terminals 71. A full-up electric squib normally contains a small explosive charge, but in the gas generator 10 described herein a charge of auto ignition material 72 is positioned adjacent the electrical portion of the squib and provides the explosive charge upon electrical pulse operation of the initiator. A foil thin seal 74 is placed across the opening in which the initiator 70 and auto ignition powder 72 are mounted.

An aluminum disk seal 76 is secured across the outlet 68 from the igniter capsule 24, thereby providing a sealed interior chamber. This disk 76 is on the order of 0.004–0.006 inches thick. This chamber is filled with igniter material 78, which may be any of a variety of compositions meeting the requirements for rapid ignition and non-toxicity. A preferred material for this use is a granular mixture of 25 percent by weight of boron and 75 percent by weight of potassium nitrate ($BKNO_3$). Foil disk 76 provides pressure control at the outlet for proper ignition of the igniter granules.

The manufacturing sequence for the igniter capsule 24 is to first form the base 60 and skirt 62, and to mount the initiator 70, auto ignition charge 72 and foil seal 74 therein. The igniter cap 64 is separately formed and the aluminum disc 76 secured to close off the nozzle outlet opening 68. The igniter cap 64 is then loaded with the igniter granules 78 and the cap joined to the base by roller crimping the skirt 62 over the peripheral exterior of the cap.

After the pad 56, filter and cooling assembly 28 and gas generant cartridge 26 have been inserted into the housing 12, the igniter capsule 24 is then mounted to the housing 12, to complete assembly of the gas generator 10. With particular reference to FIG. 2, the tubular side wall 18 of the housing is dimpled inwardly along a circumference thereof, producing raised nubs 82 and 84 extending inwardly from the housing wall. The capsule 24 is inserted into the housing wall 18 until it rests against the nubs 82 and 84, in the position shown in FIG. 1. Four such nubs are preferably provided for this purpose, arrayed at 90 degree intervals about the housing wall. The open end 16 of the housing wall is then roller crimped over the peripheral portion of base 60 of the igniter capsule 24, as best seen in FIGS. 1 and 3.

Upon assembly of the igniter capsule 24 into the housing 12, the nozzle 66 of the igniter capsule extends into the recess 46 of the gas generant cartridge 26, and the outlet of the nozzle is juxtaposed the offset entry wall 48 on which the cruciform 50 is formed.

The gas generator 10 is mounted in a vehicle and a air bag is also mounted in connection therewith, the air bag being positioned and adapted to receive gas from the generator 10. In the operation of the gas generator 10, an electrical impulse from a crash sensor (not shown) fires the initiator 70. This sets off the auto ignition powder 72 in an explosive manner, rupturing the foil seal 74 and lighting the igniter powder 78. The seal 76 contains the igniter powder during initial burning thereof, which promotes uniform ignition and pressure build-up in the igniter capsule 24. Upon attaining a sufficient pressure build-up, the seal 76 ruptures and a fire ball of hot gasses is expelled through the opening 68 in nozzle 66.

The igniter fire ball has sufficient pressure to rupture the generant cartridge 26 at the cruciform 50 in the offset entry wall 48, permitting the fire ball to flow into the load of gas generant pellets 52. The gas generant pellets 52 ignite substantially simultaneously, and the pressure of the resulting combustion gasses builds up within the cartridge 26 until the aluminum side wall 30 thereof ruptures. The gasses then flow through the filtering and cooling assembly 28 and exit the openings 20 in the housing 12. The combustion of the gas generant pellets 52 is of sufficiently high temperature and vigor that the aluminum walls of the cartridge 26 are substantially consumed, with the residue being trapped in the filter and cooling assembly 28. The filter and cooling assembly also traps residue from the gas generant pellets themselves, as well as restrains any burning pieces thereof carried outwardly by the gas flow.

Because the walls of the gas generant cartridge 26 closely surround the gas generant pellets 52, the pressure build-up in the cartridge occurs quite quickly and the rupture of the cartridge walls occurs soon after ignition of the gas generant pellets. However the volume of gas in the cartridge is relatively small, e.g., compared with prior art inflators in which a rupturable foil seal is wrapped about the exterior of the housing. This causes inflation of the air bag to begin promptly, but to proceed more slowly during the initial phases, contributing to protecting an out-of-position passenger against too rapid deployment of the air bag.

Other features of the inflator 10 which also contribute to such protection for the out-of-position passenger are the selection of the size of the gas generant pellets; namely, using relatively large pellets having a greater volume to surface area relationship, so that burning of the entire volume of the pellets proceeds more slowly. The pellet size specified above has proven useful in providing an inflator for a passenger side air bag, but the pellet size is a function of volume and configuration of the air bag as well so that no particular pellet size can be considered preferred for all restraint systems. Also contributing to protection for the out-of-position passenger is the density of the filter and cooling pack 28, which retards the surge of initial pressure.

A further aspect of the operation of the inflator 10 occurs when it is subject to extreme heat condition, such as in a fire. In such condition, when the ambient temperature reaches approximately 350° Fahrenheit, the auto ignition charge 72 self-ignites, setting off the igniter powder and consequently the gas generant pellets 52. In that temperature range, the aluminum housing 12 retains its structural integrity, and the gas generator 10 produces gasses through its openings 20. Without benefit of the auto ignition powder, the igniter powder and/or gas generant pellets would self-ignite at temperatures exceeding 600° F., at which the aluminum would not have structural integrity whereby the housing could blow apart in fragments.

Accordingly, a preferred embodiment of a gas generator 10 has been described which admirably achieves the objects of the invention herein. With reference to the description of the preferred embodiment, those skilled in the art will appreciate that modifications may be made to the invention without departing from the spirit thereof. Therefore, it is not intended that the scope of the invention be limited to the specific embodiment illustrated and described. Rather, it is intended that the scope of the invention be determined by the appended claims and equivalents thereof.

We claim:

1. A gas generator for a vehicle occupant restraint system, comprising:
    a housing having a plurality of gas outlet openings formed therethrough and deployed to provide substantially neutral thrust;
    multiple units of solid pyrotechnic gas generant material contained within the housing;
    an igniter capsule mounted to the housing and containing igniter material and having means for igniting the igniter material, the igniter capsule defining an exit opening adjacent to the gas generant material; and
    a nozzle surrounding the exit opening and extending therefrom for directing hot combustion products from the igniter capsule toward the gas generant material, said nozzle having length greater than diameter and providing a restricted outlet opening, whereby ignition and burning of the igniter material creates an expulsion of hot combustion products through the nozzle of the igniter capsule into the gas generant material, thereby igniting it for producing and releasing gas through the plurality of gas outlet openings.

2. A gas generant as defined in claim 1 wherein the exit opening is covered by a rupturable seal, which ruptures upon burning of the igniter material and consequent build-up of pressure in the igniter capsule, thereby permitting expulsion of hot combustion products through the nozzle surrounding the exit opening.

3. A gas generator as defined in claim 2 wherein the rupturable seal is a metal disk sealed to the igniter capsule and positioned over the exit opening.

4. A gas generator as defined in claim 2 wherein the means for igniting the igniter material is an electrically operable initiator and initiator charge, and the initiator charge is an auto ignition material for igniting in fire conditions below the temperature at which the housing loses structural integrity.

5. A gas generator as defined in claim 4 and further comprising a sealed cartridge having walls containing the gas generant material, the sealed cartridge having a rupturable entry wall juxtaposed the nozzle extending from the exit opening of the igniter capsule.

6. A gas generator as defined in claim 1 and further comprising a sealed cartridge having walls containing the gas generant material, the sealed cartridge having a rupturable entry wall juxtaposed the nozzle extending from the exit opening of the igniter capsule.

7. A gas generator as defined in claim 1 wherein the means for igniting the igniter material is an electrically operable initiator and initiator charge, and the initiator charge is an auto ignition material for igniting in fire conditions below the temperature at which the housing loses structural integrity.

8. A gas generator as defined in claim 7 wherein the initiator charge is an auto ignition material for igniting in fire conditions below the temperature at which the housing loses structural integrity.

9. A gas generator for a vehicle occupant restraint system, comprising:
    an elongated housing having gas outlet openings defined therethrough, the housing having a tubular side wall, a first end and end wall, and a second end;
    pyrotechnic gas generant material contained within the housing and extending from the first end and end wall toward the second end; and
    an igniter capsule mounted at the second end of the housing, the igniter capsule including a rigid base and rigid, generally hemispherical cap secured together and together containing igniter material therein, the base of the igniter capsule forming a second end wall extending across the second end of the elongated housing and secured therein, the igniter capsule having an initiator and associated initiator charge directed toward the igniter material and the cap of the igniter capsule defining a single restricted outlet opening from the igniter capsule juxtaposed the pyrotechnic gas generant material contained within the housing,
    whereby, when operated, the initiator sets off the initiator charge and resultingly the igniter material, and the igniter material thereafter causes an expulsion of hot combustion products from the igniter capsule into the pyrotechnic gas generant material for igniting it.

10. A gas generator as defined in claim 9 wherein the base of the igniter capsule includes a skirt extending from the periphery thereof, the generally hemispherical cap is placed against the periphery of the base within the skirt, and the skirt is roll crimped over the cap.

11. A gas generator as defined in claim 10 wherein the cap includes a nozzle extending from the exit opening toward the pyrotechnic gas generant material.

12. A gas generator as defined in claim 11 wherein the exit opening is covered by a rupturable seal, which ruptures to release hot combustion products from the igniter capsule.

13. A gas generator as defined in claim 10 wherein the elongated housing has inwardly projecting nubs spaced from the second end thereof, the capsule is mounted in the second end of the housing in engagement with the nubs, and the second end of the housing wall is roll crimped inwardly to secure the capsule with the housing.

14. A gas generator as defined in claim 9 wherein the exit opening is covered by a rupturable seal, which ruptures to release hot combustion products from the igniter capsule.

15. A gas generator as defined in claim 14 wherein the cap includes a nozzle extending from the exit opening toward the pyrotechnic gas generant material.

16. A gas generator as defined in claim 9 wherein the capsule is positioned within the tubular side wall of the housing near the second end thereof, and the housing wall adjacent the second end is formed inwardly over the capsule to close the housing and secure the capsule therein.

17. A gas generator as defined in claim 9 and further comprising a sealed generally cylindrical cartridge containing the pyrotechnic gas generant material.

18. A gas generator as defined in claim 17 and further comprising a filter and cooling means positioned between the sealed cartridge and the gas outlet openings of the housing.

19. A gas generator as defined in claim 17 wherein the igniter capsule has a nozzle extending toward the sealed cartridge, the sealed cartridge has an end wall adjacent the outlet of the nozzle extending from the igniter capsule, and the cartridge end wall has a rupturable entry portion against which the nozzle directs hot combustion products from the igniter capsule.

20. A gas generator as defined in claim 19 wherein the rupturable entry portion of the cartridge wall includes a recess offsetting the rupturable entry portion inwardly, and the nozzle is received in the offset recess.

21. A gas generator as defined in claim 20 and further comprising a filter and cooling means positioned between the sealed cartridge and the gas outlet openings of the housing.

22. A gas generator for a vehicle occupant restraint system, comprising:
an elongated cylindrical housing having gas outlet openings defined therein;
a metal sealed cylindrical cartridge containing pyrotechnic gas generant material, the cartridge having a tubular side wall rupturable to release gas produced by the pyrotechnic gas generant material, when ignited, the cartridge further having end walls with one of the end walls being thicker than the tubular side wall and including a rupturable entry portion structurally weaker than the surrounding portion of the end wall, the sealed gas generant cartridge being received within the elongated cylindrical housing; and
an igniter charge deployed adjacent the rupturable entry end wall portion of the sealed gas generant cartridge and means for igniting the igniter charge;
whereby, when ignited, the igniter material produces hot combustion products which rupture the entry portion of the cartridge end wall, enter the cartridge and ignite the pyrotechnic gas generant material therein.

23. A gas generator as defined in claim 22 and further comprising a filter and cooling means positioned between the sealed cartridge and the gas outlet openings of the housing.

24. A gas generator as defined in claim 22 wherein the rupturable entry portion of the end wall comprises scoring.

25. A gas generator as defined in claim 24 wherein the scoring is in the configuration of a cruciform.

26. A gas generator as defined in claim 25 wherein the tubular side wall of the gas generant cartridge comprises a roll sheet of aluminum having an overlapped sealed seam, and the end walls of the gas generant cartridge are end caps having skirts which fit over the tubular side wall and are sealed thereto.

27. A gas generator as defined in claim 26 wherein the gas generant cartridge is sealed by hot melt adhesive applied to the seam of the tubular side wall and the skirts of the end caps.

28. A gas generator as defined in claim 27 wherein the sealed gas generator cartridge includes at least one wrap of filter screen deployed inside and adjacent to the tubular side wall, the filter screen providing additional rigidity to the sealed gas generant cartridge.

29. A gas-generator as defined in claim 22 wherein the sealed gas generator cartridge includes at least one wrap of filter screen deployed inside and adjacent to the tubular side wall, the filter screen providing additional rigidity to the sealed gas generant cartridge.

30. A gas generator as defined in claim 24 wherein the sealed gas generant cartridge is formed of metal, the end wall on which the rupturable entry portion is formed is thicker than the tubular side wall, and the rupturable entry portion is a weakened portion of the end wall.

31. A gas generator as defined in claim 30 wherein the rupturable entry portion of the end wall comprises scoring.

32. A gas generator for a vehicle occupant restrain system, comprising:
an elongated cylindrical housing having a tubular side wall, a first end and end wall and a second end;
a plurality of gas outlet opening defined in the tubular wall of the cylindrical housing, the gas outlet openings being deployed in diametrically opposed groups;
a tubular filter and cooling assembly received in the housing extending from the first end wall and position adjacent tubular side wall, the tubular filter and cooling assembly having plural layers of filter material including screening;
a cylindrical sealed gas generant cartridge received in the housing within the tubular filter and cooling assembly, the gas generant cartridge having a rupturable tubular side wall and a end cap stronger than the tubular side wall and having a rupturable entry wall portion facing the second end of the housing, the gas generant cartridge containing a pyrotechnic gas generant material;
an igniter capsule including a base mounted at and closing the second end of the housing;
the igniter capsule base defining an opening receiving and mounting an electrically operable initiator with terminals thereof exposed on the exterior of the housing;
an initiator charge mounted adjacent the initiator for ignition thereby;
igniter powder contained within the igniter capsule adjacent the initiator charge for ignition thereby;
the initiator capsule further including a cap cooperating with the base to contain the igniter material, the cap having a rupturably sealed exit opening defined by a nozzle directed at the rupturable entry wall portion of the gas generant cartridge.

* * * * *

UNITED STATES PATENT AND TRADEMARK OFFICE
CERTIFICATE OF CORRECTION

PATENT NO. : 5,409,259
DATED : 25 April 1995
INVENTOR(S) : Cunningham et al.

It is certified that error appears in the above-indentified patent and that said Letters Patent is hereby corrected as shown below:

Title page, Item [56] Reference Cited: Paxton et al., "4,988,751" should be --4,998,751--.

Item [56] column 2, "George W. Pauchfuss, Jr." should be --George W. Rauchfuss, Jr.--.

At column 10, line 19, "claim 24" should be --claim 29--.

Signed and Sealed this

Twenty-eighth Day of May, 1996

Attest:

BRUCE LEHMAN

Attesting Officer     Commissioner of Patents and Trademarks